(12) United States Patent
Youn et al.

(10) Patent No.: US 9,008,606 B2
(45) Date of Patent: Apr. 14, 2015

(54) METHOD FOR REQUESTING EMERGENCY SERVICE AT MOBILE STATION IN A WIRELESS COMMUNICATION SYSTEM

(75) Inventors: Ae Ran Youn, Anyang-si (KR); Yong Ho Kim, Anyang-si (KR); Ki Seon Ryu, Anyang-si (KR); Hee Jeong Cho, Anyang-si (KR); Young Soo Yuk, Anyang-si (KR)

(73) Assignee: LG Electronics Inc., Seoul (KR)

( * ) Notice: Subject to any disclaimer, the term of this patent is extended or adjusted under 35 U.S.C. 154(b) by 34 days.

(21) Appl. No.: 13/260,242

(22) PCT Filed: Apr. 2, 2010

(86) PCT No.: PCT/KR2010/002042
§ 371 (c)(1),
(2), (4) Date: Nov. 8, 2011

(87) PCT Pub. No.: WO2010/114333
PCT Pub. Date: Oct. 7, 2010

(65) Prior Publication Data
US 2012/0064854 A1 Mar. 15, 2012

Related U.S. Application Data

(60) Provisional application No. 61/166,231, filed on Apr. 2, 2009.

(30) Foreign Application Priority Data

Mar. 24, 2010 (KR) .................. 10-2010-0026220

(51) Int. Cl.
| | | |
|---|---|---|
| H04M 11/04 | (2006.01) | |
| H04W 4/00 | (2009.01) | |
| H04B 7/216 | (2006.01) | |
| H04W 74/08 | (2009.01) | |
| H04W 4/22 | (2009.01) | |
| H04W 72/04 | (2009.01) | |
| H04W 74/00 | (2009.01) | |
| H04W 76/00 | (2009.01) | |

(Continued)

(52) U.S. Cl.
CPC ............ *H04W 74/0833* (2013.01); *H04W 4/22* (2013.01); *H04W 72/042* (2013.01); *H04W 74/008* (2013.01); *H04W 76/007* (2013.01)

(58) Field of Classification Search
USPC ............... 455/404.1, 404.2; 370/328, 335
See application file for complete search history.

(56) References Cited

U.S. PATENT DOCUMENTS

| | | |
|---|---|---|
| 2004/0203573 A1 | 10/2004 | Chin et al. |
| 2007/0053306 A1 | 3/2007 | Stevens |

(Continued)

FOREIGN PATENT DOCUMENTS

| | | |
|---|---|---|
| EP | 1575327 | 9/2005 |
| WO | 2006114043 | 11/2006 |

*Primary Examiner* — William Nealon
(74) *Attorney, Agent, or Firm* — Lee, Hong, Degerman, Kang & Waimey

(57) ABSTRACT

A method for requesting an emergency service to a base station and a mobile station using the same are disclosed. During initial network entry, a mobile station may transmit an emergency message to a base station using an emergency Flow Identifier (FID), and receive from the base station information about resources allocated according to a default service flow parameter predefined for the emergency service by the base station. The mobile station may transmit to the base station a ranging request message including an emergency service indicator indicating an emergency service request, and receive from the base station a ranging response message including an emergency FID allocated by the BS as a response to the emergency service request. The emergency FID is the emergency FID received in the ranging response message. If the default service flow parameter is not predefined for the emergency service, the mobile station may establish an emergency service flow by a Dynamic Service Addition (DSA) transaction with the base station.

10 Claims, 6 Drawing Sheets

(56) References Cited

U.S. PATENT DOCUMENTS

| | | | |
|---|---|---|---|
| 2007/0280430 A1* | 12/2007 | He | 379/37 |
| 2008/0009262 A1* | 1/2008 | Rudolf et al. | 455/404.1 |
| 2009/0109932 A1* | 4/2009 | Maheshwari et al. | 370/335 |
| 2009/0186594 A1* | 7/2009 | Kang et al. | 455/404.1 |
| 2010/0124901 A1* | 5/2010 | Shi et al. | 455/404.2 |
| 2010/0135205 A1* | 6/2010 | Li et al. | 370/328 |

* cited by examiner

METHOD FOR REQUESTING EMERGENCY SERVICE AT MOBILE STATION IN A WIRELESS COMMUNICATION SYSTEM

CROSS-REFERENCE TO RELATED APPLICATIONS

This application is the National Stage filing under 35 U.S.C. 371 of International Application No. PCT/KR2010/002042, filed on Apr. 2, 2010, which claims the benefit of earlier filing date and right of priority to Korean Application No. 10-2010-0026220, filed on Mar. 24, 2010, and also claims the benefit of U.S. Provisional Application Ser. No. 61/166,231, filed on Apr. 2, 2009, the contents of which are all incorporated by reference herein in their entireties.

TECHNICAL FIELD

The present invention relates to wireless communication, and more particularly, to a method for requesting an emergency service in a wireless communication system and a Mobile Station (MS) using the same.

BACKGROUND ART

A description will be made below of an outline of a wireless emergency service and a scenario of requesting and acquiring location information for a wireless emergency rescue service. Also, a conventional method for initially accessing and ranging with a Base Station (BS) at an MS will be described in brief.

Emergency services are intended to notify occurrence of emergencies to persons, countries, or communities and deal with the emergencies. For example, an emergency service provides a person in an emergency situation with a rescue operation and issues an emergency warning about a specific disaster area. There are largely two types of emergency services, wireless emergency rescue service and wireless emergency alert service.

The wireless emergency rescue service locates a wireless mobile communication user and provides safe rescue assistance to him, when a fire, a crime or any other emergency has occurred to him. The wireless emergency alert service alerts wireless subscribers within a specific geographical area of an upcoming storm, earthquake, tsunami, or Chemical, Biological and Radiological (CBR) accident by issuing an emergency notification. To issue the alert, a warning message is broadcast to all MSs located in the specific area. The wireless emergency alert service involves simple message broadcasting or detection of the locations of MSs, thus not imposing much load on a network.

However, a big problem is actually that when the network is overloaded with accessing users in a disaster or an exceptional situation, all MSs may be disconnected. In this case, services may not be provided normally to the MSs in a conventional technology. For example, when a disaster happens in a particular area, the number of calls increases in the disaster area and thus the network is congested with initially accessing users. This congestion may be controlled separately by a control operation at or above a Medium Access Control (MAC) layer and a physical-layer operation.

From the viewpoint of service flow, the use of resources at or above the MAC layer may be readily controlled according to the access feature of each subscriber. However, no restriction is imposed on the physical layer in an emergency situation, which leads to overheated competition for radio resources. The resulting resource dissipation causes network inefficiency. At worst, even MSs with high priority (e.g. governmental terminals, public institute terminals, etc.) cannot access the network.

With physical-layer limitations on support of emergency services, MSs may have difficulty in initial network entry and in inter-Radio Access Technology (RAT) handover. During initial ranging in which an MS attempts initial network entry, the MS suffers from jamming from other general MSs. Hence, the MS cannot detect signals or detects wrong parameters, which makes communication of the MS impossible. Even though signal detection is possible, a Base Station (BS) keeps or releases connections only when it gets knowledge of the priority levels of MSs that attempt initial access by performing a predefined procedure. Accordingly, it may occur that network entry is impossible without an appropriate physical model for initial access.

The same thing applies to inter-RAT handover. If associated systems exchange all needed system information and thus an MS can perform an intra-RAT handover procedure immediately when it enters a target system, the problem may be avoided.

However, all procedures are performed, starting with initial ranging access even for the inter-RAT handover because specific physical/system parts such as initial access are not shared yet (not compatible in a specification phase). In case of high initial access load, even an MS with a high priority level may not enter the network.

However, there is no specified technique for requesting an emergency service to a BS during initial network access or in a connected state by an MS.

DISCLOSURE

Technical Problem

An object of the present invention devised to solve the problem lies on a method for requesting an emergency service to a Base Station (BS) during initial network entry at a Mobile Station (MS).

Another object of the present invention devised to solve the problem lies on a method for requesting an emergency service to a BS in a connected state at an MS.

Another object of the present invention devised to solve the problem lies on an MS for requesting an emergency service to a BS during initial network entry.

A further object of the present invention devised to solve the problem lies on an MS for requesting an emergency service to a BS in a connected state.

It will be appreciated by persons skilled in the art that the objects that could be achieved with the present invention are not limited to what has been particularly described hereinabove and the above and other objects that the present invention could achieve will be more clearly understood from the following detailed description taken in conjunction with the accompanying drawings.

Technical Solution

The object of the present invention can be achieved by providing a method for requesting an emergency service to a BS during initial network entry at an MS in a mobile communication system, including transmitting an emergency message to the BS using an emergency Flow Identifier (FID), and receiving from the BS information about resources allocated according to a default service flow parameter predefined for the emergency service by the BS.

The emergency service requesting method may further include transmitting to the BS a ranging request message including an emergency service indicator indicating an emergency service request, and receiving from the BS a ranging response message including an emergency FID allocated by the BS as a response to the emergency service request. The emergency FID may be the emergency FID received in the ranging response message.

The emergency service requesting method may further include establishing an emergency service flow by a Dynamic Service Addition (DSA) transaction with the BS, if the default service flow parameter is not predefined for the emergency service.

In another aspect of the present invention, provided herein is a method for requesting an emergency service to a BS in a connected state at an MS in a mobile communication system, including transmitting a bandwidth request to the BS using an emergency FID, and receiving an ACKnowledgment (ACK) signal for the bandwidth request from the BS.

The emergency service requesting method may further include transmitting to the BS a DSA request message including an emergency service indicator indicating an emergency service request, and receiving from the BS a DSA response message including an emergency FID allocated by the BS as a response to the emergency service request. The emergency FID may be the emergency FID received in the DSA response message.

The emergency service requesting method may further include establishing an emergency service flow by a DSA transaction with the BS, if the default service flow parameter is not predefined for the emergency service.

In another aspect of the present invention, provided herein is an MS for requesting an emergency service to a BS during initial network entry in a mobile communication system, including a transmission module for transmitting an emergency message to the BS using an emergency FID, and a reception module for receiving from the BS information about resources allocated according to a default service flow parameter predefined for the emergency service by the BS.

The MS may further include a transmission module for transmitting to the BS a ranging request message including an emergency service indicator indicating an emergency service request, and a reception module for receiving from the BS a ranging response message including an emergency FID allocated by the BS as a response to the emergency service request. The emergency FID may be the emergency FID received in the ranging response message.

The MS may further include an emergency service flow setup module for establishing an emergency service flow by a DSA transaction with the BS, if the default service flow parameter is not predefined for the emergency service.

In a further aspect of the present invention, provided herein is an MS for requesting an emergency service to a BS in a connected state in a mobile communication system, including a transmission module for transmitting a bandwidth request to the BS using an emergency FID, and a reception module for receiving an ACK signal for the bandwidth request from the BS.

The MS may further include a transmission module for transmitting to the BS a DSA request message including an emergency service indicator indicating an emergency service request, and a reception module for receiving from the BS a DSA response message including an emergency FID allocated by the BS as a response to the emergency service request. The emergency FID may be the emergency FID received in the DSA response message.

The MS may further include an emergency service flow setup module for establishing an emergency service flow by a DSA transaction with the BS, if the default service flow parameter is not predefined for the emergency service.

Advantageous Effects

According to the emergency service requesting methods of the present invention, an emergency communication can be efficiently supported between an MS and a BS during initial network entry or in a connected state.

It is possible to support an emergency service to an MS according to the access priority level of the MS in a wireless communication environment.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

In the drawings.

BEST MODE

Reference will now be made in detail to the exemplary embodiments of the present invention with reference to the accompanying drawings. The detailed description, which will be given below with reference to the accompanying drawings, is intended to explain exemplary embodiments of the present invention, rather than to show the only embodiments that can be implemented according to the invention.

The following detailed description includes specific details in order to provide a thorough understanding of the present invention. However, it will be apparent to those skilled in the art that the present invention may be practiced without such specific details. For example, the following detailed description is given under the assumption that a mobile communication system is an Institute of Electrical and Electronics Engineers (IEEE) 802.16m system. However, the description is applicable to any other mobile communication system except for specific features inherent to the IEEE 802.16m system.

In some instances, known structures and devices are omitted, or are shown in a block diagram form focusing on important features of the structures and devices, so as not to obscure the concept of the present invention. The same reference numbers will be used throughout this specification to refer to the same or like parts.

In the following description, the term 'Mobile Station (MS)' is assumed to refer to a mobile or fixed user end device such as a User Equipment (UE), an Advanced Mobile Station (AMS), etc. and the term 'Base Station (BS)' is assumed to refer to any node of a network end, such as a Node B, an enhanced Node B (eNB or eNode B), an Access Point (AP), etc., communicating with the MS.

In a mobile communication system, an MS may receive information from a BS on a DownLink (DL) and transmit information to the BS on an UpLink (UL). The information transmitted from or received at the MS includes data and various control information and a variety of physical channels are defined according to the types and usages of the information.

Service flow parameters for an emergency service may be predefined in a system. If a default service flow has been predefined for an emergency service flow, an emergency Flow Identifier (FID) for the default service flow may be either predefined or allocated by a BS.

A description will be made of a method for requesting an emergency service to a BS during initial ranging at an MS that attempts initial network entry.

When the MS attempts network entry, the MS may request an emergency service to the BS during initial ranging. An emergency FID may be predefined or not for the emergency service.

Figure 1:
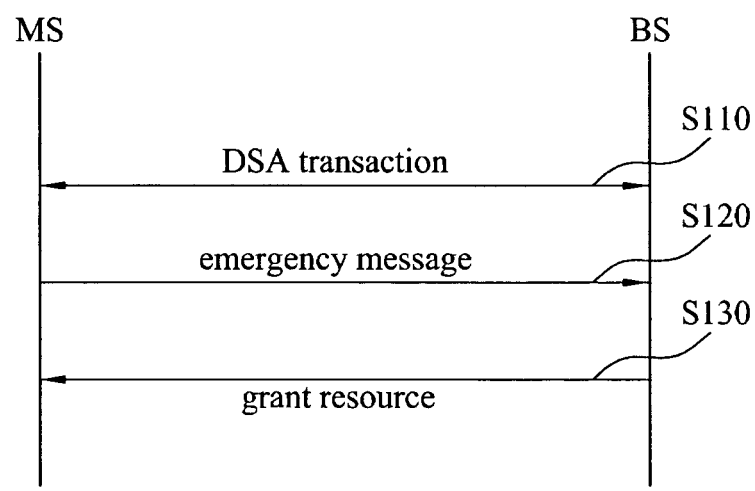
FIG. 1 is a diagram illustrating a signal flow for an operation for requesting an emergency service during network entry at a Mobile Station (MS), in the case where an emergency Flow Identification (FID) has been defined for the emergency service in a Base Station (BS) according to an exemplary embodiment of the present invention.

FIG. 1 is a diagram illustrating a signal flow for an operation for requesting an emergency service during network entry at an MS, in the case where an emergency FID has been defined for the emergency service in a BS according to an exemplary embodiment of the present invention.

Referring to FIG. 1, if default service flow parameters have not been defined for the emergency service, the MS and the BS may establish an emergency service flow via a Dynamic Service Addition (DSA) transaction in step S110. On the contrary, if the emergency service flow parameters have been defined, the MS may communicate with the BS using the predefined FID without going through the complete service flow setup through DSA transaction step S110. That is, when the emergency service flow parameters are predefined, the MS may transmit a Medium Access Control (MAC) message such as an Advanced Air Interface Ranging Request (AAI_RNG-REQ) message using the predefined FID to the BS in step S120. Then the BS may allocate resources to the MS according to the default service flow parameters defined for the emergency service and notify the MS of the allocated resources in step S130.

Figure 2:
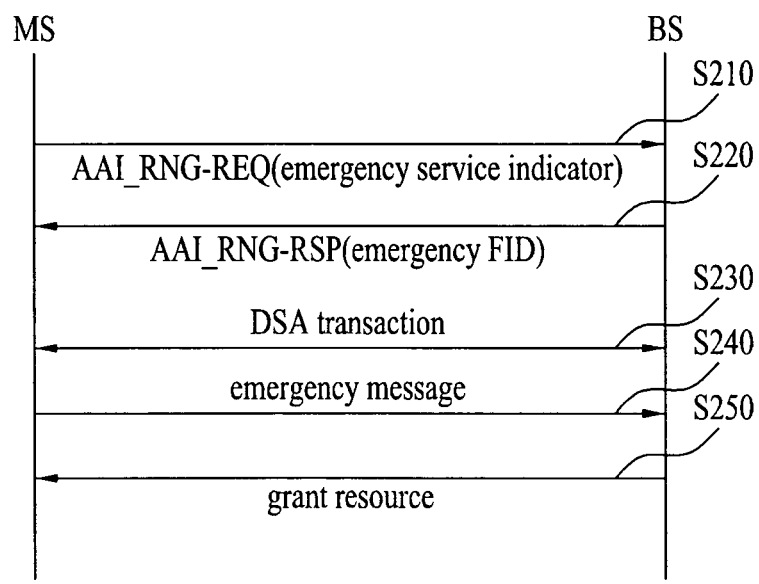
FIG. 2 is a diagram illustrating a signal flow for an operation for requesting an emergency service during network entry at an MS, in the case where an emergency FID has not been defined for the emergency service in a BS according to an exemplary embodiment of the present invention.

FIG. 2 is a diagram illustrating a signal flow for an operation for requesting an emergency service during network entry at an MS, in the case where an emergency FID has not been defined for the emergency service in a BS according to an exemplary embodiment of the present invention.

An emergency FID for the emergency service may not be predefined in the BS. Then the MS may request the emergency service to the BS using a dedicated ranging code (a dedicated preamble) defined for supporting the emergency service.

Referring to FIG. 2, when an emergency FID is not predefined for the emergency service, the MS may transmit a ranging request message (e.g. AAI_RNG-REQ) including an emergency service indicator indicating an emergency service request to the BS in step S210. Upon receiving the ranging request message, the BS may allocate an emergency FID and transmit a ranging response message (e.g. Advanced Air Interface Ranging Response (AAI_RNG-RSP)) including the allocated emergency FID to the MS in step S220. If default service flow parameters have not been defined to support the emergency service, the MS and the BS may need to perform a DSA transaction to establish an emergency service flow in step S230. However, if the default service flow parameters have been defined, the MS and the BS do not need to perform the DSA transaction.

In step S240, the MS may transmit an emergency message indicating an emergency service request using the emergency FID included the received ranging response message, to the BS. Then the BS may allocate (grant) resources to the MS according to the default service flow parameters and notify the MS of the allocated resources in step S250.

An emergency FID value may be reserved. Table 1 below lists exemplary FIDs including the reserved emergency FID.

TABLE 1

| value | Description |
| --- | --- |
| 00000 | Control FID (unicast control FID when PDU is allocated by unicast assignment A-MAP IE; broadcast control FID when PDU is allocated by broadcast assignment A-MAP-IE) |
| 0001 | FID for signaling header |
| 1110-1110 | Transport FID |
| 1111 | Emergency FID |

In Table 1, the reserved emergency FID value may be '1111'. The reserved FID for supporting the emergency service, that is, the emergency FID illustrated in Table 1 may be transmitted to MSs on a broadcast channel by the BS. The emergency FID may be cell-specific and changed by the BS. If the MS and the BS agreed on an emergency FID, the BS needs to indicate the emergency FID to the MS on a particular channel. Also, neighbor BSs may use the same emergency FID.

Now a description will be made of a method for requesting an emergency service to a BS at an MS in a connected state.

In the case where a network-connected MS requests an emergency service to a BS, if default service flow parameters are predefined for the emergency service, the MS may transmit Bandwidth Request (BR) to the BS using a predefined emergency FID in order to notify an emergency service request. The predefined emergency FID may be included in a signaling header and/or an extended header. Instead of a specific emergency FID, the MS may use an emergency service indicator or a predetermined value for a specific parameter (e.g. request size, Quality of Service (QoS), priority, scheduling type, etc.).

Table 2 below illustrates an exemplary BR header including the reserved emergency FID.

TABLE 2

| FlowID for signaling header (4) | Signaling type | BR type |
|---|---|---|
| FlowID (4)-0000(1111) | Other contents (station ID, request size) | |

Referring to Table 2, an FID field for signaling header includes the reserved emergency FID which may be a predetermined value (e.g. '1111').

The MS may perform a BR procedure using the predefined emergency FID in the connected state to notify the BS of the emergency service request. There are two types of BR procedures, 5-step BR and 3-step BR. An emergency service request method will be described according to the 5-step or 3-step BR procedure.

Figure 3:
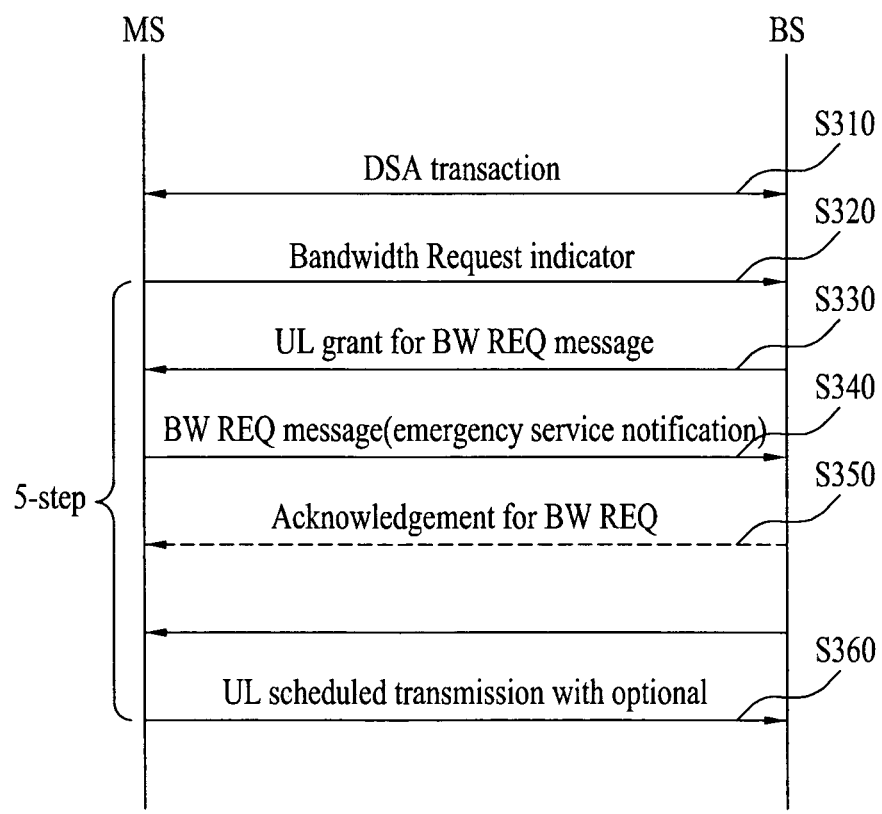
FIG. 3 is a diagram illustrating a signal flow for an operation for requesting an emergency service in a connected state at an MS, in the case where an emergency FID has been defined for the emergency service in a BS according to an exemplary embodiment of the present invention.

FIG. 3 is a diagram illustrating a signal flow for an operation for requesting an emergency service in a connected state at an MS, in the case where an emergency FID has been defined for the emergency service in a BS according to an exemplary embodiment of the present invention.

Referring to FIG. 3, if default service flow parameters have not been defined for the emergency service, the MS and the BS may establish an emergency service flow through a DSA transaction in step S310. On the contrary, if the default service flow parameters have been defined for the emergency service, the MS may communicate with the BS using the predefined emergency FID without going through the complete service flow setup through the DSA transaction in step S310. That is, if the emergency FID has been defined for the emergency service, the MS may transmit a BR indicator to the BS in step S320.

Then the MS may receive a UL grant for a BandWidth Request (BW-REQ) message from the BS in step S330. Upon receiving, the MS may transmit a BW-REQ message including emergency service notification information to the BS in step S340. Upon receiving the BW-REQ message, the BS may transmit an ACKnowledgment (ACK) signal for the BW-REQ message to the MS in step S350. Subsequently, the MS may perform UL scheduled transmission to the BS in step S360.

Figure 4:
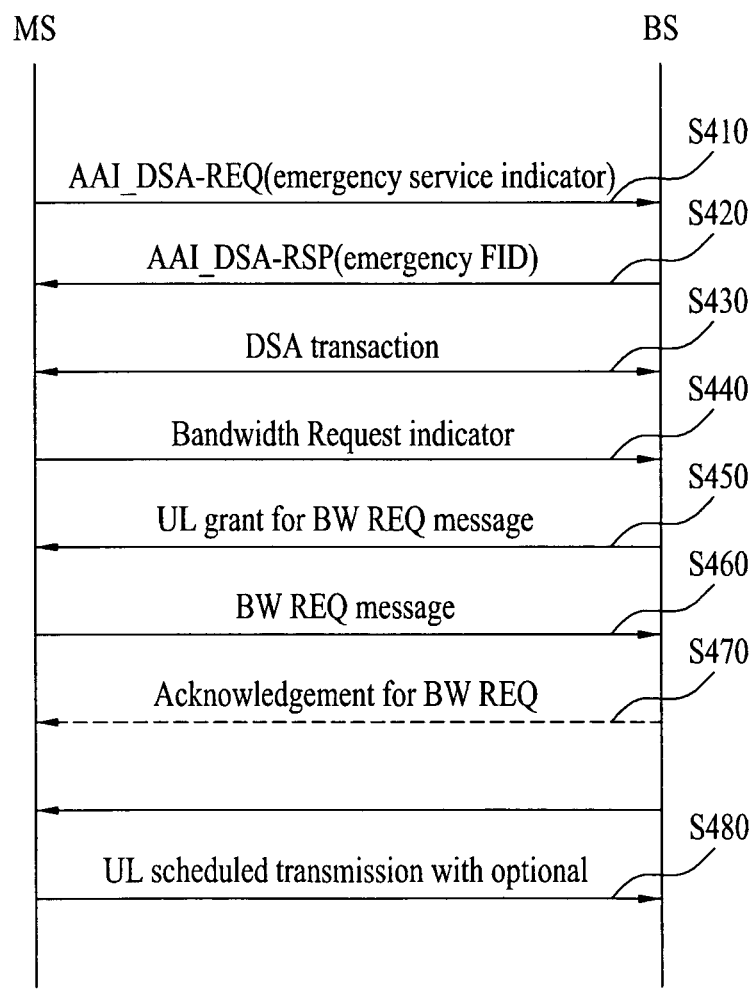
FIG. 4 is a diagram illustrating a signal flow for an operation for requesting an emergency service in a connected state at an MS, in the case where an emergency FID has not been defined for the emergency service in a BS according to an exemplary embodiment of the present invention.

FIG. 4 is a diagram illustrating a signal flow for an operation for requesting an emergency service in a connected state at an MS, in the case where an emergency FID has not been defined for the emergency service in a BS according to an exemplary embodiment of the present invention.

Referring to FIG. 4, if an emergency FID has not been defined for the emergency service, the MS may transmit an Advanced Air Interface Dynamic Service Addition Request (AAI_DSA-REQ) message including an emergency service indicator to the BS in step S410. In step S420, the BS may transmit an Advanced Air Interface Dynamic Service Addition Response (AAI_DSA-RSP) message including an emergency FID to the MS in step S420.

If default service flow parameters have not been defined for the emergency service, the MS and the BS may establish an emergency service flow through a DSA transaction in step S430. On the contrary, if the emergency FID has been defined for the emergency service, the MS may communicate with the BS without going through the complete service flow setup through the DSA transaction step S430.

Subsequently, the MS may transmit a BR indicator to the BS in step S440 and receive a UL grant for a BW-REQ message from the BS in step S450. Upon receiving the UL grant, the MS may transmit a BW-REQ message indicating an emergency service request by the emergency FID to the BS in step S460. The BS may transmit an ACK signal for the received BW-REQ message to the MS in step S470. Then the MS may perform UL scheduled transmission to the BS in step S480.

The BW-REQ message that the MS transmits in step S340 of FIG. 3 or in step S460 of FIG. 4 may take the form of a MAC signaling header. Details of the MAC signaling header are illustrated in Table 3. Table 3 illustrates an exemplary MAC signaling header.

TABLE 3

| Syntax | Size (bit) | Notes |
|---|---|---|
| MAC Signaling Header( ) { | | |
| FlowID | 4 | Flow Identifier Set to 0001 |
| Type | 4 | MAC signaling header type |
| Contents | 40 | MAC signaling header contents |
| } | | |

Referring to Table 3, Type field identifies a MAC signaling header type. The Type field may be represented in 4 bits. A signaling header format may be identified by the Type field of the MAC signaling header. The following Table 4 lists exemplary type values that indicate MAC signaling header types.

TABLE 4

| Type field (4 bits) | MAC Signaling Header Type |
|---|---|
| 0000 | BR with STID |
| 0001 | BR without STID |
| 0010 | Service-specific BR without STID |
| 0011 | Sleep Control |
| 0100 | AMS Battery Level Report |
| 0101-1111 | Reserved |

In Table 4, there are exemplary type field values for respective MAC signaling header types.

Table 5 below illustrates another example of type field values for MAC signaling header types in the MAC signaling header of Table 3.

TABLE 5

| Type field (4 bits) | MAC Signaling Header Type |
|---|---|
| 0000 | BR with STID |
| 0001 | BR without STID |
| 0010 | Service-specific BR without STID |
| 0011 | Sleep Control |
| 0100 | AMS Battery Level Report |
| 0101-1110 | Reserved |
| 1111 | Emergency Service |

Referring to Table 5, a Type field value that identifies a MAC signaling header type indicating an emergency service request may be predetermined, for example, '1111'. In this case, a BR header may be configured in an emergency service header format as illustrated in Table 6.

TABLE 6

| Syntax | Size (bits) | Notes |
|---|---|---|
| BR for Emergency ( ) { | | |
| FID | 4 | Flow Identifier set to 0001 |

TABLE 6-continued

| Syntax | Size (bits) | Notes |
|---|---|---|
| Type | 4 | MAC signaling header type = 0b1111 |
| BR Size | 19 | Aggregated bandwidth request size in bytes |
| BR FID | 4 | The FID for which UL bandwidth is requested |
| STID | 12 | STID of the AMS which requests UL bandwidth |
| Reserved | 5 | Reserved. This field shall be filled by 0s |
| } | | |

Without defining an emergency service header type separately, the MS may request the emergency service to the BS by transmitting a signaling header including an emergency service indicator. Table 7 illustrates an example of a signaling header including an emergency service indicator.

TABLE 7

| FlowID for signaling header (4) | Signaling type | FlowID (4) |
|---|---|---|
| Emergency Service Indicator (1)-1 Other contents (e.g., station ID, request size) | | |

Table 8 illustrates a BR header configured in an STID header format, unlike Table 6. The BR header illustrated in Table 8 may include an emergency service indicator indicating an emergency service request.

TABLE 8

| Syntax | Size (bits) | Notes |
|---|---|---|
| BR with STID( ) { | | |
| FID | 4 | Flow Identifier set to 0001 |
| Type | 4 | MAC signaling header type = 0b1111 |
| BR Size | 19 | Aggregated bandwidth request size in bytes |
| BR FID | 4 | The FID for which UL bandwidth is requested |
| STID | 12 | STID of the AMS which requests UL bandwidth |
| Emergency Service indicator | 1 | Emergency Service Request Indicator 0: normal 1: emergency service |
| Reserved | 4 | |
| } | | |

As noted from Table 8, the MS may transmit a BR header including the emergency service indicator to the BS in order to indicate an emergency service request. The emergency service indicator may occupy one bit.

Table 9 illustrates a BR header without the STID header format. The BR header illustrated in Table 9 may include an emergency service indicator indicating an emergency service request.

TABLE 9

| Syntax | Size (bits) | Notes |
|---|---|---|
| BR without STID header( ) | | |
| { | | |
| FID | 4 | Flow Identifier set to 0001 |

TABLE 9-continued

| Syntax | Size (bits) | Notes |
|---|---|---|
| Type | 4 | MAC signaling header type = 0b0001 |
| BR Type | 1 | Indicates whether the requested bandwidth is incremental or aggregate 0: incremental 1: aggregate |
| BR Size | 19 | Bandwidth request size in bytes |
| BR FID | 4 | The FID for which UL bandwidth is requested |
| TI | 1 | 0; No Tx power report 1; Tx power information present |
| If(TI=1){ | | |
| UL Tx power | 8 | UL Tx power level in dBm for the burst that carries this header |
| Reserved | 7 | Shall be filled by 0s |
| } else{ | | |
| Emergency Service Indicator | 1 | Emergency Service Request Indicator 0: normal 1: emergency service |
| Reserved | 14 | Reserved. This field shall be filled by 0s |
| } | | |

Like Table 8, the BR header illustrated in Table 9 may include an emergency service indicator indicating an emergency service request. The emergency service indicator may be one bit.

It may be further contemplated as another exemplary embodiment of the present invention that the MS transmits a service-specific BR header without the STID header format to the BS in order to indicate an emergency service request. Table 10 below illustrates an example of the service-specific BR header without the STID header format.

TABLE 10

| Syntax | Size (bits) | Notes |
|---|---|---|
| Service specific BR without STID header( ){ | | |
| FID | 4 | Flow identifier set to 0001 |
| Type | 4 | MAC signaling header type = 0b0010 |
| BR Type | 1 | Indicates whether the requested bandwidth is incremental or aggregate 0; incremental 1; aggregate |
| BR Size | 19 | Bandwidth request size in bytes |
| BR FID | 4 | The FID for which UL bandwidth is requested |
| If(scheduling type == aGP service){ | | |
| QoS parameter change indicator | 1 | QoS parameter change indicator |
| SCID change indicator | 1 | |
| If(QoS parameter change indicator =1){ | | |
| Running Grant Polling Interval(GPR) | 6 | Indicating new GPI(frames) to use for future allocation |
| Emergency Service Indicator | 1 | Emergency Service Request Indicator 0: normal 1: emergency service |
| Reserved | 8 | |
| }else{ | | |
| QoS parameter set | 1 | 0; primary QoS parameter set |

TABLE 10-continued

| Syntax | Size (bits) | Notes |
| --- | --- | --- |
| switch | | 1; secondary QoS parameter set |
| If(SCID change indicator ==1){ | | |
| SCID | 4 | |
| Emergency Service Indicator | 1 | Emergency Service Request Indicator<br>0: normal<br>1: emergency service |
| Padding | 8 | |
| }else{ | | |
| Emergency Service Indicator | 1 | Emergency Service Request Indicator<br>0: normal<br>1: emergency service |
| padding } | 12 | |
| }<br>}<br>Else if(scheduling type == BE){ | | |
| Minimum grant delay | 6 | Indicating minimum delay (frames) of the requested grant |
| Emergency Service Indicator | 1 | Emergency Service Request Indicator<br>0: normal<br>1: emergency service |
| Reserved | 9 | |
| }<br>Else{ | | |
| Emergency Service Indicator | 1 | Emergency Service Request Indicator<br>0: normal<br>1: emergency service |
| Reserved | 16 | Reserved. This field shall be filled by 0s |
| }<br>} | | |

Table 11 below illustrates an exemplary sleep control header format including an emergency service indicator.

TABLE 11

| Syntax | Size | Notes |
| --- | --- | --- |
| Sleep Control header format( ){ | | |
| FID | 4 | Flow identifier set to 0001 |
| Type | 4 | MAC signaling header type = 0b0011 |
| SCH sub-type | 3 | 0b000 = listening window control<br>0b001 = resume sleep cycle indication<br>0b010 = sleep cycle configuration switch<br>0b011 = sleep cycle control<br>0b100 = multi-carrier listening window control<br>0b101-0b111 = reserved |
| Response indication | 1 | 0; this indicates the request<br>1; this indicates the response(i.e., acknowledgement) to the request |
| If(SCH sub-type == listening window control){ | | |
| Listening window end or extension | 1 | 0; listening window end indication<br>1 = listening window extension indication |
| If(listening window end or extension==1) | | |
| Last frame of extended listening window | 7 | LSB of frame sequence. Indicate the frame that extended listening window is terminated |
| }<br>}else if(SCH sub-type==resume sleep cycle indication)} | | |
| Scheduled sleep cycle interruption included | 1 | 0 = no scheduled sleep cycle interruption is included with the resume sleep cycle indication<br>1 = scheduled sleep cycle interruption is included with the resume sleep cycle indication |
| If(scheduled sleep cycle interruption included==1) | | |
| Start frame offset for scheduled sleep cycle interruption | 7 | Number of frames in the future from the frame containing this SCH at which the scheduled sleep cycle interruption will occur. Frame offset is value of this field plus one(i.e., range is 1 to 128) |
| }<br>}<br>else if (SCH sub-type == Sleep cycle configuration switch){ | | |
| SCID | 4 | SCID corresponds to the new sleep cycle setting to be switched |
| Start Frame Offset for new sleep cycle configuration | 3 | Least Significant 3 bits of Frame Number in which sleep cycle setting is to be applied. |
| }<br>else if (SCH sub-type == Sleep Cycle control) { | | |
| Next Sleep Cycle Flag (NSCF) | 2 | 0b00 = Reset to Initial Sleep Cycle 0b01 = min (2 × previous sleep cycle, Final Sleep Cycle) 0b10 = Reset to another Initial Sleep Cycle value 0b11 = Reserved |
| if (NSCF == 0b10) { | | |
| New Initial Sleep Cycle | 4 | When the current Sleep Cycle is reset, if this value is included, the current Sleep Cycle shall be reset to this value. |
| }<br>}<br>else if (SCH sub-type == Multi- Carrier Listening Window control){ | | |
| Target Carrier Index Bitmap | 4 | If nth bit is set to 1, it indicates that DL data transmission on the secondary carrier of which logical carrier index is equal to (n + 1) ends. |
| }<br>Emergency Service Indicator | 1 | Emergency Service Request Indicator<br>0: normal<br>1: emergency service |
| Padding | variable | For byte alignment |
| } | | |

As noted from Table 11, the MS may request an emergency service to the BS by transmitting a sleep control header including an emergency service indicator.

Table 12 illustrates an exemplary AMS battery level report header that the MS transmits to the BS in order to request an emergency service.

TABLE 12

| Syntax | Size (bits) | Notes |
|---|---|---|
| AMS Battery level report header( ) { | | |
| FID | 4 | Flow Identifier set to 0001 |
| Type | 4 | MAC signaling header type = 0b0100 |
| AMS battery status | 1 | 0b0; the AMS is plugged into a power source<br>0b1; the AMS is not plugged into a power source |
| Battery level indication | 1 | 0b0; the AMS is able to report detailed battery level<br>0b1; the AMS is not able to report detailed battery level |
| If(battery level indication =1){ | | |
| AMS battery level | 3 | The field appears only when the battery level indication is set to 1<br>0b001; battery level is between 75% and 100%<br>0b010; battery level is between 50% and 75%<br>0b011; battery level is between 25% and 50%<br>0b100; battery level is between 5% and 25%<br>0b101; battery level is below 5%<br>0b110-0b111; reserved |
| Reserved\ | 34 | Shall be filled by 0 |
| Emergency Service Indicator | 1 | Emergency Service Request Indicator<br>0: normal<br>1: emergency service |
| } Else { | | |
| Emergency Service Indicator | 1 | Emergency Service Request Indicator<br>0: normal<br>1: emergency service |
| Reserved | 37 | Reserved. This field shall be filled by 0s |
| } } | | |

Referring to Table 12, the MS may notify the BS of an emergency service request by transmitting an AMS battery level report header including an emergency service indicator.

The MS may transmit an extended header including an emergency service indicator to the BS in order to request an emergency service. Table 13 illustrates an example of a piggybacked BR extended header.

TABLE 13

| Syntax | Size | Notes |
|---|---|---|
| PBREH( ) { | | |
| Type | 4 | PBREH type |
| Num_of_PBR | 4 | Number of piggybacked BW request |
| For(i=0;i<num_of_PBR; i++){ | | |
| FID | 4 | Flow identifier |
| Request type | 1 | 0; aggregate<br>1; incremental |
| BR size | 19 | Amount of bandwidth requested |
| emergency Service | 1 | Emergency Service Request |

TABLE 13-continued

| Syntax | Size | Notes |
|---|---|---|
| Indicator | | indicator<br>0: normal<br>1: emergency service |
| } } | | |

Referring to Table 13, the MS may request an emergency service to the BS by transmitting a BR extended header including an emergency service indicator (for example, of one bit) to the BS.

Apart from a predetermined emergency service indicator, the MS also may request an emergency service using a predetermined value for a specific parameter such as BR request size/length, QoS, priority, scheduling type, etc.

Table 14, Table 15 and Table 16 illustrate examples of distinguishing emergency service by scheduling (service) types, priority levels (or QoS IDs).

TABLE 14

| QoS ID | service type (1) | priority (1) | usage |
|---|---|---|---|
| 1 | Delay sensitive (0) | 0 | can use for |
| 2 | Delay sensitive (0) | 1 | |
| 3 | Delay tolerant (1) | 0 | |
| 4 | Delay tolerant (1) | 1 | |

TABLE 15

| QoS ID | scheduling type | priority |
|---|---|---|
| 0 | emergency service | 0 |
| 1 | UGS | 0 |
| 2 | rtPS | 0 |
| 3 | rtPS | 1 |
| 4 | ertPS | 0 |
| 5 | ertPS | 1 |
| 6 | nrtPS | 0 |
| 7 | BE | 0 |

TABLE 16

| QoS ID | service type (2) | priority (1) |
|---|---|---|
| 1 | emergency (00) | 0 |
| 2 | Delay sensitive (01) | 0 |
| 3 | Delay sensitive (01) | 1 |
| 4 | Delay tolerant (10) | 0 |
| 5 | Delay tolerant (10) | 1 |

When a BR is used to request an emergency service, the MS may set a request size or length parameter to a predefined value for the usage of an emergency service request, or transmit a request size or length parameter using full bits (all is (e.g. 0x7FF) or all 0s) in such a manner that indicates an emergency service request. Information specifying the request size/length is not signaled and thus the request size/length needs to be preset. For instance, if the request size parameter is set to 0x7FF and 100 bytes is a preset request size, the BS may allocate resources in which to transmit 100 bytes of data to the MS.

Instead of the full bits of the request size/length parameter, partial bits of the request size/length parameter may be used. Specifically, 4 bits are predefined (e.g. value 0xF) for the usage of the emergency service, with respect to a 7-bit request size/length parameter.

These methods may be illustrated in Table 17 to Table 22.

TABLE 17

| FlowID for signaling header(4) | signaling type | FlowID(4) |
|---|---|---|
| other contents (e.g., station ID, request size) | | |

TABLE 18

| FlowID for signaling header(4) | signaling type | BR type |
|---|---|---|
| FlowID (4) | other contents (e.g., station ID, request size) | |

TABLE 19

| header type | signaling type | FlowID(4) |
|---|---|---|
| other contents (e.g., station ID, request size) | | |

TABLE 20

| FlowID(4) | EH(1) | Length(3) |
|---|---|---|
| Length(8) | | |

TABLE 21

| EH(1) | FlowID(4) | Length(3) |
|---|---|---|
| Length(8) | | |

TABLE 22

| header type(4) | signaling type | BR type |
|---|---|---|
| FlowID (4) | other contents (e.g., station ID, request size) | |

Now a description will be made of a 3-step BR procedure to request an emergency service to a BS by an MS in a connected state.

The MS may transmit a quick access message including information indicating an emergency service request to the BS. For example, the quick access message may include a 12-bit STID, and a reserved emergency FID (e.g. '1111') or a signaling FID (e.g. '1011'). In the case of using the signaling FID, a request size set to '0000' or a request size and service type set to '0000' may further be included in the quick access message. The MS may request an emergency service to the BS using the reserved emergency FID (e.g. '1111').

Alternatively, when the MS transmits a preamble and data to request a bandwidth, the preamble may include a scheduling type/priority (e.g. 3 or 4 bits) indicating an emergency service request. The data may include a Cyclic Redundancy Check (CRC) (7 to 10 bits). Selectively, a power report (2 bits) and scheduling type 2 (1 bit) may be further included in the data.

Alternatively, the MS may transmit to the BS a partial STID (3 or 4 bits) in the preamble, and a scheduling type/priority (e.g. 2 or 3 bits) indicating an emergency service request and a request size (7 bits) in the BR data. The data may further include scheduling type 2 (1 bit) selectively.

Alternatively, the MS may transmit to the BS a partial STID (3 or 4 bits) in the preamble, and scheduling type 1 (2 bits), an emergency service indicator (1 bit), and a request size (7 bits) in the data. The data may further include scheduling type 2 (1 bit) selectively.

Or the MS may transmit to the BS a reserved emergency FID (4 bits) in the preamble, and scheduling type 1 (2 bits) in the data. The data may further include a request size (6 or 7 bits) and scheduling type 2 (1 bit) selectively.

Alternatively, the MS may transmit a preamble for an emergency service in a SuperFrame Header (SFH) to the BS, or the preamble for an emergency service may be predefined Scheduling type 1 (2 bits) may be included in the data. The data may further include a request size (6 or 7 bits) and scheduling type 2 (1 bit) selectively.

Alternatively, the MS may transmit an STID and a predetermined BR index (e.g. 0000) in a quick access message to the BS in order to request a bandwidth. The MS may indicate an emergency service request to the BS using the predetermined BR index.

Alternatively, the MS may transmit an emergency service request to the BS by an extended header. That is, the MS may transmit an extended header piggybacked with emergency service notification information.

When UL resources are periodically allocated for the emergency service, the MS may transmit emergency service notification information to the BS by the extended header. The extended header may include a request type, a whole or partial STID, an FID/QoS ID, a request size, and a grant interval.

If the request type is set to '00', this may indicate a one-time additional request. If the request type is set to '01', this may indicate a periodic allocation request. If the request type is set to '10', this may indicate release of periodic allocation (that is, when a service is terminated or in the absence of transmission data). The request size may be used along with the grant interval. If the request type is '00', it may be used for the usage of the corresponding field. The grant interval may be used along with the request size. If the request type is '01', the grant interval may be used for the usage of the corresponding field. As much resources as an initial allocation size for the emergency service may be allocated.

Figure 5:
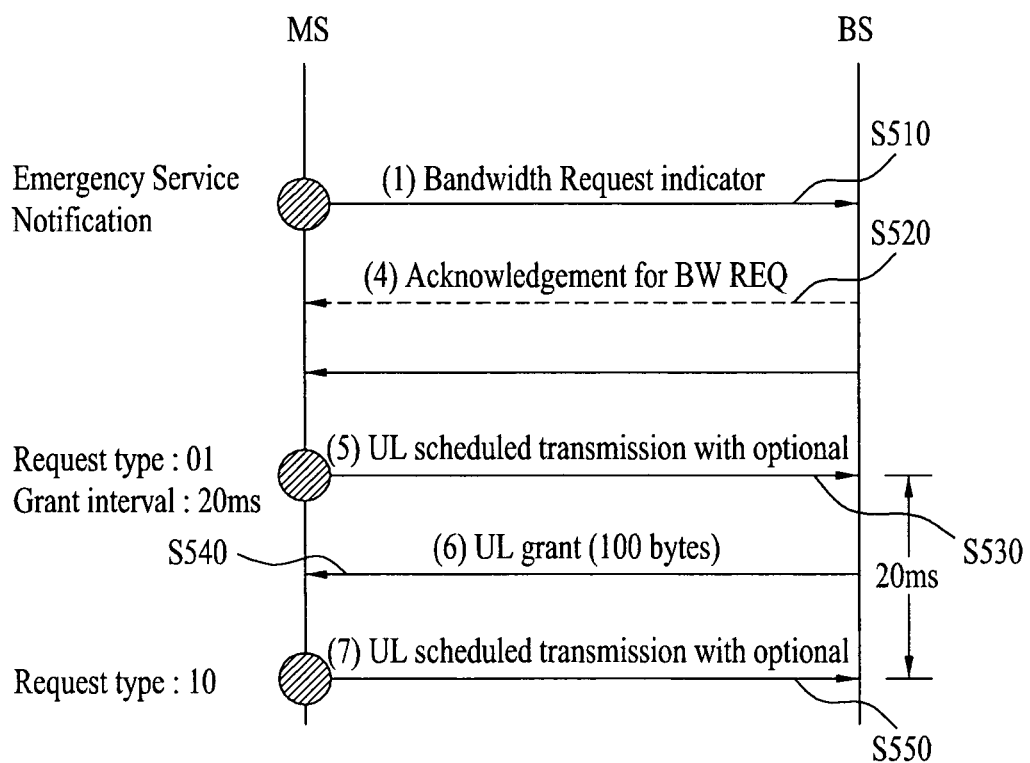
FIG. 5 is a diagram illustrating a signal flow for an operation for piggybacking an extended header with emergency service notification information and transmitting the extended header to a BS at an MS according to an exemplary embodiment of the present invention.

FIG. 5 is a diagram illustrating a signal flow for an operation for piggybacking an extended header with emergency service notification information and transmitting the extended header to a BS at an MS according to an exemplary embodiment of the present invention.

Referring to FIG. 5, the MS may transmit an emergency service request to the BS in the 3-step BR procedure. The MS may transmit a BR indicator piggybacked with emergency service notification information to the BS in step S510. Upon receiving successfully for the BR indicator, the BS may transmit an ACK signal to the MS in step S520. Then the MS may perform UL scheduled transmission to the BS in step S530. Herein, the MS may piggyback an extended header with a request type set to a predetermined value (e.g. '01') and a grant interval set to 20 ms in step S530. Then the BS may transmit a UL grant to the MS in step S540. In step S550, the MS may perform UL scheduled transmission 20 ms after step S530. When the MS needs to terminate the emergency service or release periodic allocation, the MS may transmit an extended header with a request type set to a predetermined value (e.g. '10') to the BS.

Figure 6:
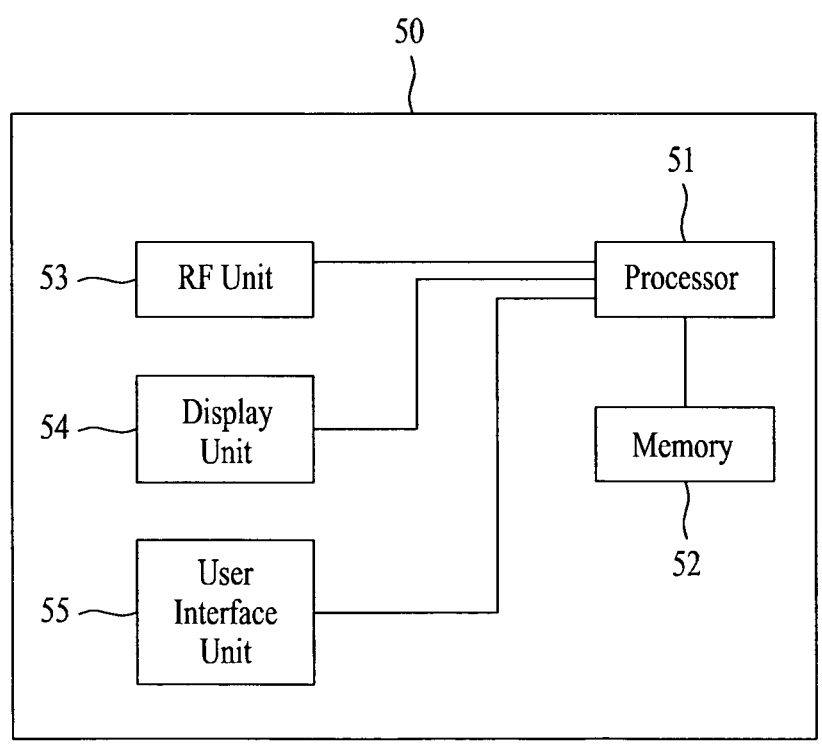
FIG. 6 is a block diagram of an MS for requesting an emergency service according to an exemplary embodiment of the present invention.

FIG. 6 is a block diagram of an MS for requesting an emergency service according to an exemplary embodiment of the present invention.

Referring to FIG. 6, an MS 50 includes a processor 51, a memory 52, a Radio Frequency (RF) unit 53, a display unit 54, and a user interface unit 55. The functionality of each layer may be implemented in the processor 51. The memory is connected to the processor 51, for storing an operating system, applications, and general files.

The display unit 54 displays various pieces of information. The display unit 54 may be configured with a known element such as Liquid Crystal Display (LCD), Organic Light Emitting Diode (OLED), etc.

The user interface unit 55 may be configured with a combination of known user interfaces such as a keypad, a touch screen, etc.

The RF unit 53 is connected to the processor 51, for transmitting and receiving RF signals. The RF unit 53 may be separated into a transmission module (not shown) and a reception module (not shown).

[Mode for Invention]

Various embodiments have been described in the best mode for carrying out the invention.

[Industrial Applicability]

A method for requesting an emergency service in a wireless communication system using FFR and an MS using the same according to the present invention are applicable to an IEEE 802.16m system, and other systems.

Exemplary embodiments described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an exemplary embodiment of the present invention or included as a new claim by a subsequent amendment after the application is filed.

The exemplary embodiments of the present invention may be achieved by various means, for example, hardware, firmware, software, or a combination thereof. In a hardware configuration, the methods according to the exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the exemplary embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

The invention claimed is:

1. A communication method by a mobile station in a mobile communication system, the method comprising:

transmitting, to a base station by the mobile station during a connected state, a dynamic service addition request (DSA-REQ) message for establishing a service flow, the DSA-REQ message including a corresponding emergency indicator field that indicates that the DSA-REQ message is a request for establishing an emergency service flow;

receiving, from the base station by the mobile station during the connected state, a dynamic service addition response (DSA-RSP) message that confirms the request for the emergency service flow and includes a flow identifier (FID) corresponding to an emergency service flow set by the base station and having a first value selected by the base station from one or more available values; and transmitting, to the base station by the mobile station during the connected state, a dynamic service change request (DSC-REQ) message that includes a corresponding emergency indicator field that indicates that the DSC-REQ message is a request for changing the emergency service flow set by the base station.

2. The method according to claim 1, wherein the transmitting the DSA-REQ comprises:

determining whether to transmit the DSA-REQ message based on whether an existing FID for the emergency service are already configured in the mobile station.

3. A mobile station comprising:

a radio frequency (RF) unit configured to transmit signals; and a processor operatively connected to the RF unit and configured to:

transmit, to a base station during a connected state, a dynamic service addition request (DSA-REQ) message for establishing a service flow, the DSA-REQ message including a corresponding emergency indicator field that indicates that the DSA-REQ message is a request for establishing an emergency service flow;

receive, from the base station during the connected state, a dynamic service addition response (DSA-RSP) message that confirms the request for the emergency service flow and includes a flow identifier (FID) corresponding to an emergency service flow set by the base station and having a first value selected by the base station from one or more available values; and transmit, to the base station during the connected state, a dynamic service change request (DSC-REQ) message that includes a corresponding emergency indicator field that indicates that the DSC-REQ message is a request for changing the emergency service flow set by the base station.

4. The mobile station according to claim 3, wherein the processor is further configured to determine whether to transmit the DSA-REQ message based on whether an existing FID for the emergency service are already configured in the mobile station.

5. A method for communicating by a base station in a mobile communication system, the method comprising:

receiving, by the base station from a mobile station during a connected state, a dynamic service addition request (DSA-REQ) message for establishing a service flow, the DSA-REQ message including a corresponding emergency indicator field that indicates that the DSA-REQ message is a request for establishing an emergency service flow;

transmitting, by the base station to the mobile station during the connected state, a dynamic service addition response (DSA-RSP) message that confirms the request for the emergency service flow and includes a flow identifier (FID) corresponding to an emergency service flow set by the base station and having a first value selected by the base station from one or more available values; and receiving, by the base station from the mobile station during the connected state, a dynamic service change request (DSC-REQ) message that includes a corresponding emergency indicator field that indicates that the DSC-REQ message is a request for changing the emergency service flow set by the base station.

6. A base station comprising:
a radio frequency (RF) unit configured to transmit signals; and
a processor operatively connected to the RF unit and configured to:
   receive, from a mobile station during a connected state, a dynamic service addition request (DSA-REQ) message for establishing a service flow, the DSA-REQ message including a corresponding emergency indicator field that indicates that the DSA-REQ message is a request for establishing an emergency service flow;
   transmit, to the mobile station during the connected state, a dynamic service addition response (DSA-RSP) message that confirms the request for the emergency service flow and includes a flow identifier (FID) corresponding to an emergency service flow set by the base station and having a first value selected by the base station from one or more available values; and
   receive, from the mobile station during the connected state, a dynamic service change request (DSC-REQ) message that includes a corresponding emergency indicator field that indicates that the DSC-REQ message is a request for changing the emergency service flow set by the base station.

7. The method of claim 2, wherein the DSA-RSP message further comprises parameters for establishing the emergency service flow.

8. The method of claim 1, further comprising:
transmitting a bandwidth request message to the base station using the FID corresponding to the emergency service flow set by the base station.

9. The method of claim 1, wherein the corresponding emergency indicator field consists of 1 bit, the FID consists of 4 bits, and the value excludes predetermined values that are reserved for a normal service flow.

10. The method of claim 9, wherein the predetermined values that are reserved for a normal service flow include 0001 and 0010.

* * * * *